United States Patent [19]

Gephardt et al.

[11] Patent Number: 5,218,681
[45] Date of Patent: Jun. 8, 1993

[54] APPARATUS FOR CONTROLLING ACCESS TO A DATA BUS

[75] Inventors: Douglas D. Gephardt; James R. MacDonald, both of Austin, Tex.

[73] Assignee: Advanced Micro Devices, Inc., Sunnyvale, Calif.

[21] Appl. No.: 576,061

[22] Filed: Aug. 31, 1990

[51] Int. Cl.$^5$ .......................................... G06F 13/14
[52] U.S. Cl. ........................ 395/325; 364/DIG. 1; 364/240.2; 364/239; 364/239.3; 364/232.9
[58] Field of Search ...................... 395/325, 275, 725

[56] References Cited

U.S. PATENT DOCUMENTS

| | | | |
|---|---|---|---|
| 4,646,232 | 2/1987 | Chang et al. | 395/325 |
| 4,777,591 | 10/1988 | Chang et al. | 395/800 |
| 4,935,868 | 6/1990 | DuLac | 395/325 |
| 5,083,259 | 1/1992 | Maresh et al. | 395/325 |
| 5,088,028 | 2/1992 | Theus et al. | 395/325 |

Primary Examiner—Michael R. Fleming
Assistant Examiner—Debra A. Chun
Attorney, Agent, or Firm—Foley & Lardner

[57] ABSTRACT

An apparatus for use with a host computing system for controlling access to a first data bus which is external of the host computing system and which first data bus is operatively connected with a second data bus internal of the host computing system. The apparatus comprises a local processing unit which is configured substantially the same as the host processing unit and is driven by a separate local program distinct from the host processing program driving the host processing unit. The apparatus further comprises a supplemental processing circuit for processing information, which supplemental processing circuit is responsive to the host processing unit and to the local processing unit to determine whether the host processing unit or the local processing unit has operative access to the first data bus. In its preferred embodiment, the first data bus and the second data bus are operatively connected by a configurable buffer circuit for effecting data bus connection. Further, in the preferred embodiment of the present invention, the supplemental processing circuit generates an intervention signal in response to the local processing unit, the buffer circuit responding to the intervention signal by configuring appropriately to provide operative access by the apparatus of the second data bus.

6 Claims, 3 Drawing Sheets

APPARATUS FOR CONTROLLING ACCESS TO A DATA BUS

CROSS REFERENCE TO RELATED APPLICATIONS

The following applications contain subject matter similar to the subject matter of this application.

(TT0091) U.S. patent application Ser. No. 07/576,012, filed Aug. 31, 1990; entitled "Integrated Digital Processing Apparatus";

(TT0092) U.S. patent application Ser. No. 07/576,601, filed Aug. 31, 1990; entitled "System for Effecting Communications Between a Computing Device and a Plurality of Peripheral Devices";

(TT0093) U.S. patent application Ser. No. 07/576,017, filed Aug. 31, 1990; entitled "Apparatus for Use with a Computing Device Controlling Communications with a Plurality of Peripheral Devices";

(TT0097) U.S. patent application Ser. No. 07/576,019, filed Aug. 31, 1990; entitled "System for Controlling Communications Among a Computer Processing Unit and a Plurality of Peripheral Devices"; and (TT0099) U.S. patent application Ser. No. 07/576,695, filed Aug. 31, 1990; entitled "Apparatus for Use with a Computing Device for Generating a Substitute Acknowledgement to an Input when the Computing Device is in an Operational Hiatus".

BACKGROUND OF THE INVENTION

The present invention is directed to an apparatus for use with a local computing system for controlling access to a local computing system. The local computing system includes a local processing unit and a local buffer unit operatively connected by a local internal system bus. The local buffer unit controls communications access between an expansion bus and the local internal system bus. The expansion bus is external of both the local computing system and the host computing system. The host computing system includes a host processing unit and a host buffer unit operatively connected by a host internal system bus. Specifically, the present invention is directed to an apparatus commonly known as a bus master circuit used in controlling access by a local computing system to an internal system bus associated with a host computing system.

Of particular interest in connection with the present invention is the structure of the bus master circuit as an integral part of a computer processing unit which may be utilized either as a host computer processing unit (requiring no bus master capability) or as a local computer processing unit (requiring a bus master capability). The mode in which the particular processing unit is employed is determined by setting bits in a register to enable or disable the bus master support circuit portion of the processing unit architecture.

By such incorporation of a bus master support circuit integrally within the design of a computer processing unit, the costs of integration already incorporated for design and manufacture of the computer processing unit are spread across additional applications for which the unit may be utilized. That is, the marginal increase in design and integration cost to incorporate the bus master support circuit of the present invention is minimal in comparison with similar design and integration costs which would be incurred for a wholly separate bus master support circuit.

Further, by employing an integrated system design approach, a computer processing unit configured to operate as a bus master local processing unit has additional intelligent processing capability not generally found nor economically designed into prior art bus master circuits.

SUMMARY OF THE INVENTION

The invention is an apparatus for use with a host computing system for controlling access to a host computing system. The apparatus comprises an address register for generating an address designation signal in response to an address designation input received from the local processing unit; a mode designator for generating a mode designation signal in response to a mode designation input received from the local processing unit; an address comparing unit for comparing the address designation signal with a currently addressed location signal received from the local processing unit. The currently addressed location signal indicates an address location addressed by the local processing unit during the extant clock cycle. The address comparing unit generates an address hit indication signal when the address designation signal is in a predetermined relationship with the currently addressed location signal. The apparatus further comprises a state designating unit for establishing a current operating state for the apparatus in response to a mode designation input received from the mode designator. The state designating unit is operatively connected with the host buffer unit and generates a host bus request signal to ascertain whether the host internal bus is available for control by the local processing unit in response to the address hit indication signal received from the address comparing means. The host buffer unit generates a host bus acknowledge signal and operatively connects the host internal bus with the expansion bus in response to the host bus request signal when the host internal bus is available for control by the local processing unit. The sate designating unit generates an actuating signal in response to the host bus acknowledge signal, a portion of the actuating signal being a state indicating signal. The local buffer unit operatively connects the local internal bus with the expansion bus in response to the actuating signal. The operative connection of the local internal bus with the expansion bus being effected in a predetermined configuration in response to the state indicating signal. In the preferred embodiment of the invention, the apparatus of the present invention is integrally configured with the local processing unit.

It is, therefore, an object of the present invention to provide an apparatus for use with a local computing system for controlling access to a host computing system which is economical to manufacture.

A further object of the present invention is to provide an apparatus for use with a local computing system for controlling access to a host computing system which is integrally formed with a computing unit.

Yet a further object of the present invention is to provide an apparatus for use with a local computing system for controlling access to a host computing system which includes a local processing unit capable of intelligent manipulation of data in response to a program.

Further objects and features of the present invention will be apparent from the following specification and claims when considered in connection with the accom-

DETAILED DESCRIPTION OF THE DRAWINGS

DETAILED DESCRIPTION OF THE INVENTION

Figure 1:
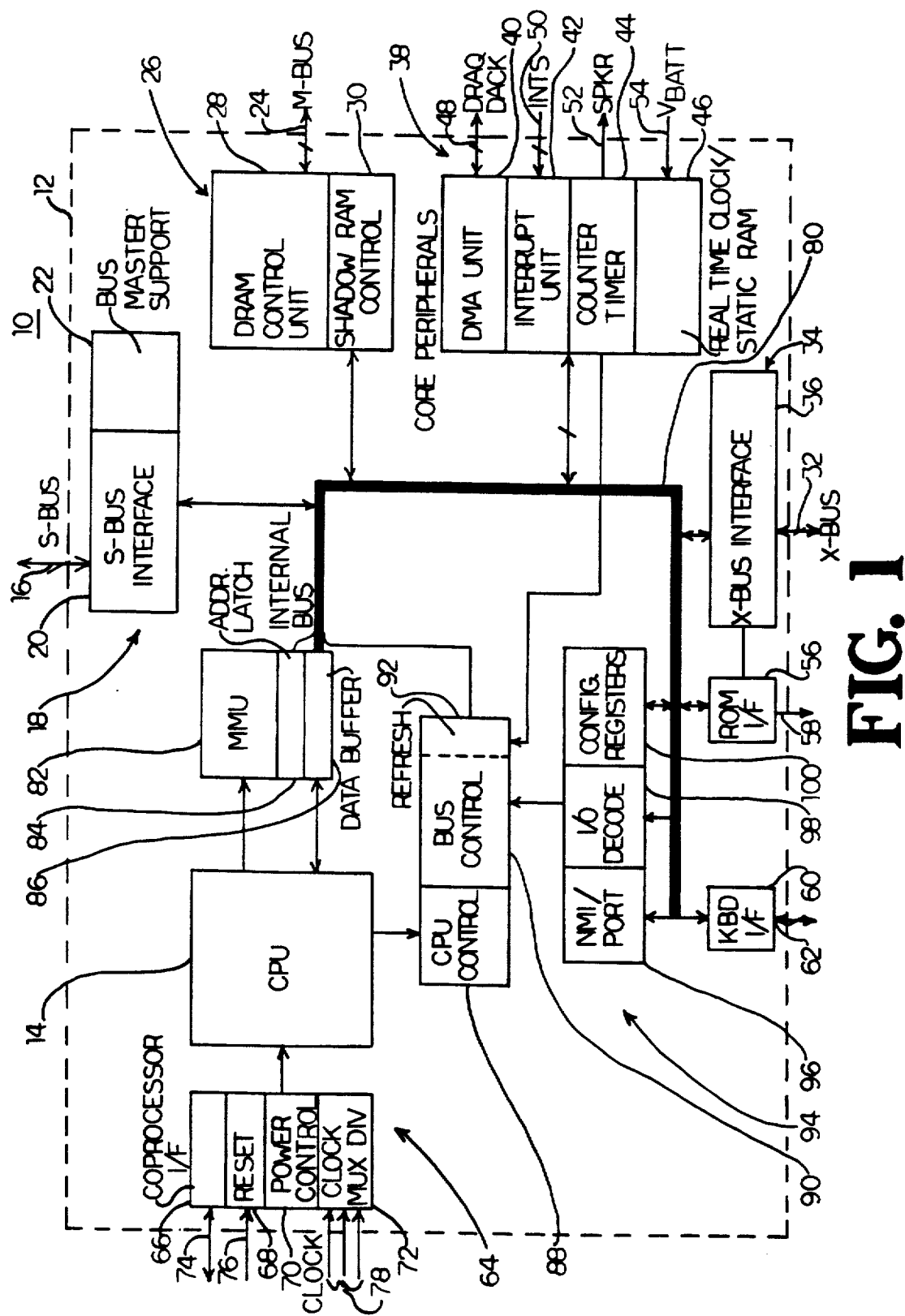
FIG. 1 is a system-level schematic drawing of a computing system incorporating the preferred embodiment of the present invention.

FIG. 1 is a system-level schematic diagram of the preferred embodiment of the present invention. In FIG. 1, an apparatus 10 is illustrated as situated on a single substrate 12. Apparatus 10 includes a computer processing unit 14, a connection 16 for an S-bus (not shown) and supportive peripheral devices 18 comprising an S-bus interface circuit 20 and a bus master support circuit 22. S-bus supportive peripheral devices 18 are preferably configured to accommodate direct connection of an S-bus to apparatus 10 with no additional peripheral devices required for an effective operative connection.

Similarly, a connection 24 for an M-bus (not shown) has associated therewith M-bus supportive peripheral devices 26, including a dynamic random access memory (DRAM) control unit 28 and a shadow random access memory (RAM) control unit 30. Preferably, M-bus supportive peripheral devices 26 are configured to allow direct connection of the M-bus to M-bus connection 24 with no additional supportive peripheral devices required for an effective operative connection.

A connection 32 with an X-bus (not shown) is also provided for apparatus 10. Associated with X-bus connection 32 are X-bus supportive peripheral devices 34, including an X-bus interface 36. X-bus supportive peripheral devices 34 are preferably configured to allow direct connection of the X-bus to X-bus connection 32 with no additional peripheral devices required for an effective operative connection.

In the environment in which it is anticipated the preferred embodiment of the present invention would be employed, i.e., an AT-configured computing system, the S-bus is intended for use as a system-expansion bus to which would be connected industry-standard signal generators, timing devices, and other expansion cards and subsystems. Similarly, in such a preferred AT system configuration, the M-bus is used for communication to direct DRAM interfaces, while the X-bus is employed as an expansion bus to effect connection with such devices as read-only memories (ROMs), keyboard controllers, numeric co-processors, and the like.

Apparatus 10 further comprises a plurality of core peripheral devices 38 which include, by way of example, a direct memory access (DMA) unit 40, an interrupt unit 42, a counter/timer device 44, and a real time clock and static RAM device 46. The various core peripheral devices 38 are operatively connected to input-output pins in order to perform their intended function. Thus, DMA unit 40 is operatively connected with input-output pins 48 in order to receive data request signals (DREQ) and transmit data acknowledgement signals (DACK), interrupt unit 42 is operatively connected with input-output pins 50 in order to receive interrupt signals (Ints), counter/timer device 44 is operatively connected with input-output pins 52 to provide operative connection with a system speaker (Spkr), and real time clock and static RAM device 46 is operatively connected to input-output pins 54 in order to receive power from a power supply, such as VBatt.

While ROMs and keyboard controllers are connectable to apparatus 10 by X-bus connection 32, the preferred embodiment of apparatus 10 illustrated in FIG. 1 also provides for direct ROM connection to a ROM interface 56 through an input-output pins 58. Similarly, a keyboard interface 60 is also provided for access to apparatus 10 via input-output pins 62.

Also illustrated in the system-level diagram of FIG. 1 are additional supportive peripheral devices 64, including a co-processor interface 66, a reset circuit 68, a power control circuit 70, and a clock multiplexer and divider unit 72. Input-output pins are provided for access to the various additional supportive peripheral devices 64 so that co-processor interface 66 is connected with input-output pins 74, reset circuit 68 is connected with input-output pins 76, and clock multiplexer divider unit 72 is connected with a plurality of input-output pins 78.

An internal bus 80 is provided to effect communications among the various components of apparatus 10, including S-bus supportive peripheral devices 18, M-bus supportive peripheral devices 26, X-bus supportive peripheral devices 34, core peripheral devices 38, and computer processing unit 14. Computer processing unit (CPU) 14 is operatively connected with internal bus 80 via memory management unit (MMU) 82 and its associated address latch 84 and data buffer 86.

Computer processing unit 14 is responsive to a CPU control device 88, which CPU control device 88 is in intimate communicational relation with a bus control device 90. Bus control device 90 is operatively connected with internal bus 80 and includes a refresh generator 92 which i responsive to counter/timer 44 to periodically refresh specified components of apparatus 10, such as dynamic RAMs (DRAMs) through DRAM control unit 28.

Internal supportive peripheral devices 94 are situated intermediate internal bus 80 and bus control circuit 90, including a non-maskable interface (NMI) port 96, an input-output decode circuit 98, and configurable registers 100.

Thus, apparatus 10 provides appropriate bus-accommodating means such as S-bus supportive peripheral devices 18, M-bus supportive peripheral devices 26, and X-bus supportive peripheral devices 34, as well as ROM interface 56 and keyboard interface 60, to support direct connection of peripheral devices via data buses to apparatus 10 with no additional supportive peripheral devices required. Effective and efficient internal communications within apparatus 10 are provided by internal bus 80, access to which is controlled by bus control circuit 90 so that computer processing unit 14 may provide information to or receive information from any of the several supportive external buses via internal bus 80. Further, information may be exchanged among the various external buses according to bus control circuit 90, as dictated by the program driving computer processing unit 14, all via internal bus 80.

In its preferred embodiment, apparatus 10 is configured on a single substrate 12 as an integrated digital circuit, thereby providing the advantages of higher operating speed, lower power consumption, and reduced occupancy of "real estate" in its physical embodiment.

In order to facilitate understanding of the present invention, like elements will be indicated by like reference numerals in the various drawings.

Figure 2:
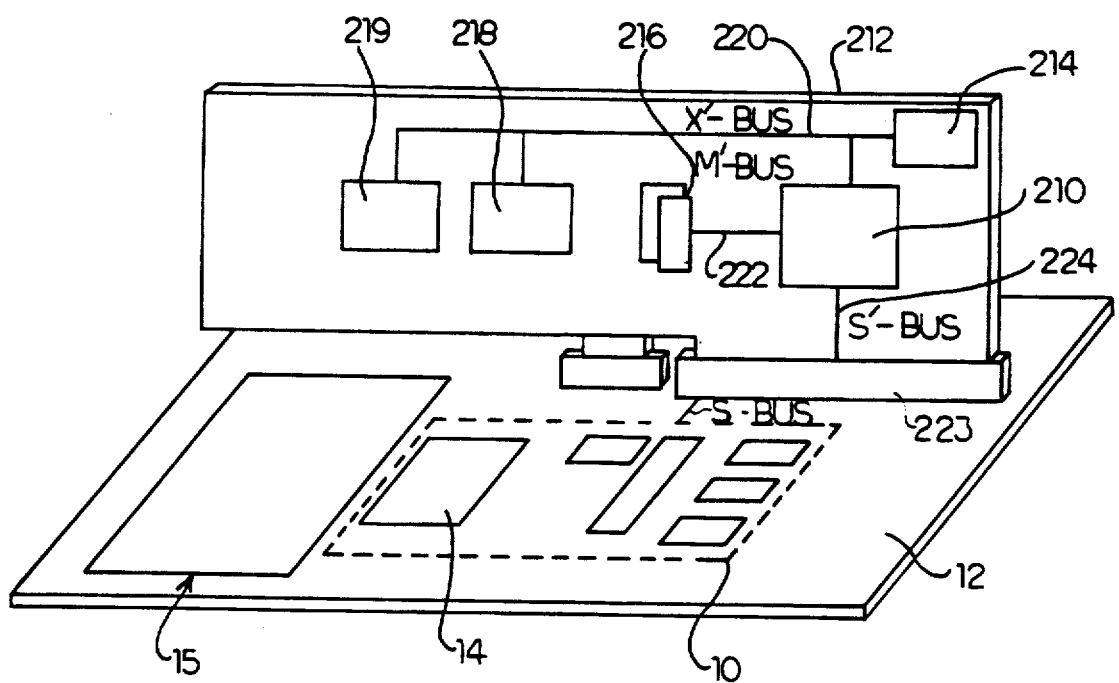
FIG. 2 is a schematic perspective drawing illustrating the employment of the present invention with a host computing system.

FIG. 2 is a schematic perspective drawing illustrating the employment of the present invention with a host computing system. In FIG. 2, a host processing system 10 (described in detail in connection with FIG. 1), including a computer processing unit 14, is carried with associated devices 15 on a substrate 12.

The apparatus 210 of the present invention is carried on a substrate 212. Also carried on substrate 212 are additional devices in support of apparatus 210, such as erasable programmable memories (EPROMs) 214, dynamic random access memories (DRAMs) 216, and peripherals 218, 219. For purposes of clarity, as well as to facilitate understanding of the present invention, similar buses associated with apparatus 10 and with apparatus 210 will be denoted similarly, with buses associated with apparatus 210 being further denoted with a "prime" annotation. Thus, EPROM 214 and peripherals 218, 219 are associated with X'-bus 220; DRAMs 216 are associated with M'-bus 222; and S'-bus 224 is operatively connected with apparatus 10 at its S-bus interface 20 (see FIG. 1), not shown in detail in FIG. 2. In its preferred embodiment, S'-bus 224 is connected to S-bus 16 (see FIG. 1) via a pin connector 223. Host processing system 10 of FIG. 2 and apparatus 210 of FIG. 2 may both be configured as illustrated in FIG. 1.

Figure 3:
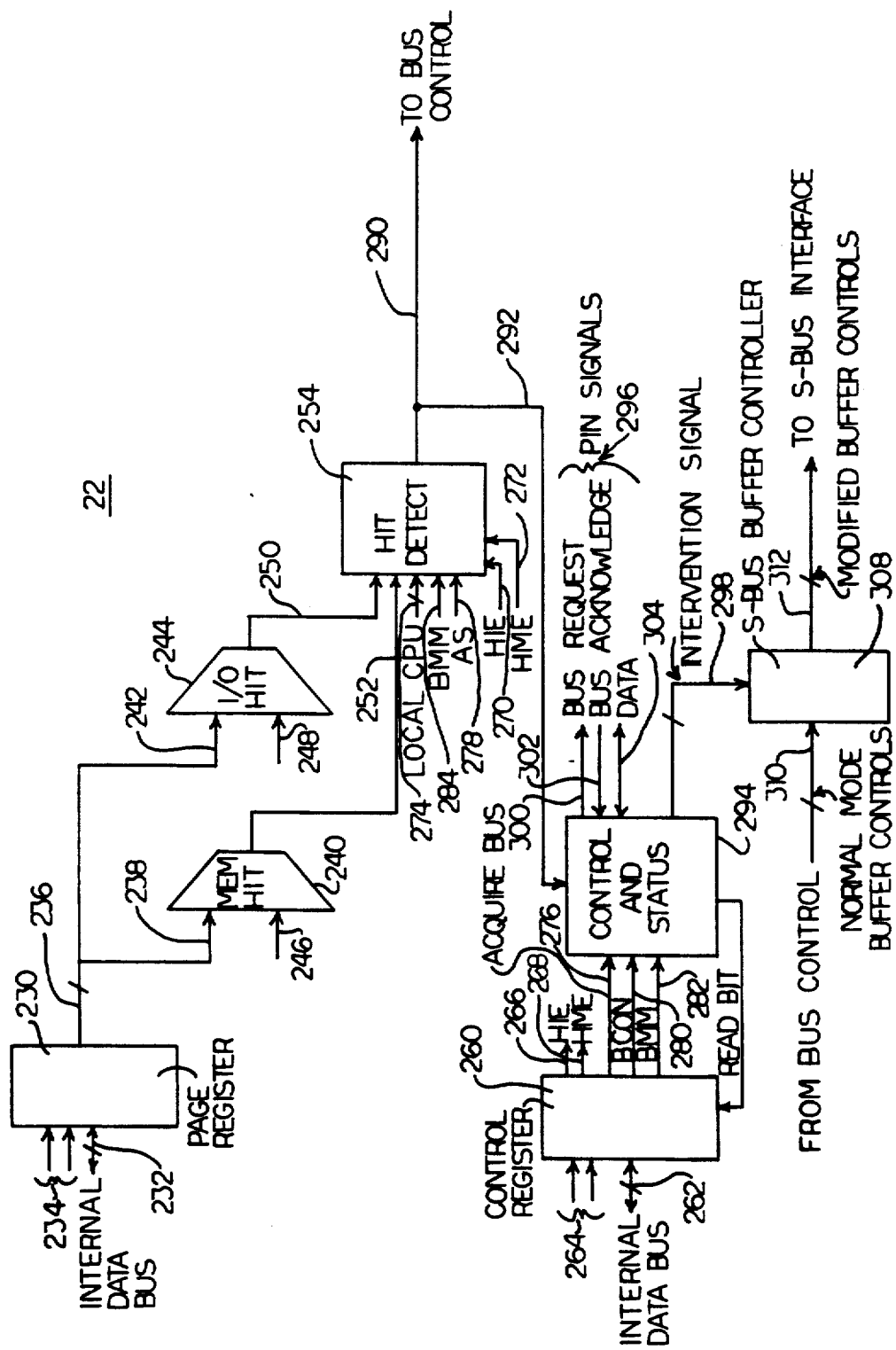
FIG. 3 is a schematic diagram of the preferred embodiment of the present invention.

FIG. 3 is a schematic diagram of the preferred embodiment of the present invention. In FIG. 3, a bus master support circuit 22 is illustrated. Bus master support circuit 22 illustrated in FIG. 3 is integrally incorporated in a local computing system 10 as illustrated in FIG. 1. Apparatus 22 is comprised of a page register 230 which receives address information from local processing unit 10 via local internal data bus 80 (not shown) at bus connector 232, and receives read/write control information local processing unit 10 via local internal data bus 80 (not shown) at input 234. Page register 230 produces an address page output signal at output 236 and applies that signal at an input 238 to a memory hit compare device 240, as well as at an input 242 to an input-output hit compare unit 244.

Address information relating to memory operations, which is identified by the particular address bits provided, is provided from local processing unit 10 indicating the address location currently addressed by local processing unit 10 as input 246 to memory hit compare unit 240. Similarly, address information relating to input-output operations, likewise identifiable by the particular bits provided, is applied from local processing unit 10 indicating the address location currently addressed by local processing unit 10 as input 248 of input-output hit compare unit 244. Thus, one of the memory hit compare unit 240 and input-output hit compare unit 244 will produce an output indicating a "hit", i.e., an equality of comparison of address page output signal from page register 230 and address information received at input 246 or input 248. Thus, either output 250 from input-output hit compare unit 244 or output 252 from memory hit compare unit 240 will be positive, but not both. Outputs 250, 252 are applied as inputs to hit detect unit 254.

Bus master support apparatus 22 also includes a control register 260 for receiving information from local processing unit 10 via local internal data bus 80 (not shown) at bus connector 262 and for receiving read-write signals from local processing unit 10 via local internal bus 80 (not shown) at input 264. Control register 260 has a number of outputs, including data type indicators HIE at output 266 and HME at output 268.

Thus, page register 230 and control register 260 cooperate whereby page register 230 sets a window address by its address page output signal 236 and control register 260 sets a window type: input-output type operation (output signal HIE 266); or memory-type operation, (output signal HME 268). Note that signal HIE is provided at input 270 and signal HME is provided at input 272 of hit detect unit 254. In such manner, hit detect unit 254 ascertains the window address as well as window type associated with a given operation by receiving inputs 250, 252, 270, 272.

Local computer processing unit 10 status is provided to detect unit 254 at bus connector 274. Additional outputs of control register 260 are also applied as inputs to hit detect unit 254: acquire bus output 276 from control register 260 is applied to control and status unit 294 to indicate whether access to S-bus 16 (FIG. 1) is desired; signal BCON at output 280 of control register 260 and signal BMM at output 282 of control register 260 control whether bus master support circuit 22 is engaged or not engaged. Signal BMM is applied as input 284 of hit detect unit 254. Input 278 provides an indication to hit detect unit 254 when S-bus 16 (FIG. 1) is acquired.

Thus, when there is a match as to desired window type (indicated by signal HIE at input 270 and signal HME at input 272) with desired window address (indicated at inputs 250, 252), and the local computer processing unit is effecting the correct type of transfer, such as memory read, memory write, input-output read, or input-output write, (indicated by input 274), and bus master support circuit 22 is engaged (indicated by inputs 284 and 278), then a "hit" is detected and an output hit-detect signal is applied to output 290 from hit detect unit 254. The hit-detect signal at output 290 is applied to local buffer or local bus control unit 90 (see FIG. 1), as well as provided as an input 292 to control and status circuit 294.

Control and status unit 294 is a programmable logic unit or state machine responsive to its various inputs, which include outputs 276, 280, 282 from control register 260 and output 292 from hit detect unit 254 to produce outputs responsive to those various inputs according to a program in either the form of pin signals 296 or the form of an intervention signal at output 298, or both. Pin signals 296 relate to communicating to the host computer processing unit to inquire whether the local processing unit may take control of the host computer processing unit's internal bus and comprise a bus request signal 300 which is issued by control and status unit 294 when it is desired that bus master support circuit 22 take control of S-bus interface 20 of the host computing system (not shown). The host computing system indicates that such control by bus master support unit 22 will be allowed by issuing a bus acknowledge signal which is received by control and status unit 294 at input 302. Once a bus acknowledge signal is received at input 302, an enabling signal is passed on control line 304 to S-bus interface 20 (FIG. 1) to enable data transfer on S-bus 16 (FIG. 1).

An intervention signal 298 is produced by control and status unit 294 when it is desired to take control of S-bus interface 20 of a host device and, in such case (as manifested by receipt of a bus acknowledge signal at input 302), intervention signal 298 is applied to local S-bus buffer control unit 308 in order to modify normal buffer control signals received from local bus control unit 90 (not shown) on bus connector 310 to produce modified buffer control signals to local S-bus interface 20 on output bus connector 312.

It is to be understood that, while the detailed drawings and specific examples given describe preferred embodiments of the invention, they are for the purpose of illustration only, that the apparatus of the invention is not limited to the precise details and conditions disclosed and that various changes may be made therein without departing from the spirit of the invention which is defined by the following claims:

We claim:

1. An apparatus for use with a local computing system for coordinating control access by said local computing system to a host computing system; said local computing system including a local processing unit and a local buffer unit operatively connected by a local internal system bus, said local buffer unit controlling communications access between an expansion bus and said local internal system bus; said host computing system including a host processing unit and a host buffer unit operatively connected by a host internal system bus, said host buffer unit controlling communications access between said expansion bus and said host internal system bus; the apparatus comprising:

an address register means for generating an address designation signal in response to an address designation input received from said local processing unit;

a mode designator means for generating a mode designation signal in response to a mode designation input received from said local processing unit;

an address comparing means for comparing said address designation signal with a currently addressed location signal received from said local processing unit, said currently addressed location signal indicating an address location addressed by said local processing unit during the extant clock cycle; said address comparing means generating an address hit indication signal when said address designation signal is in a predetermined relationship with said currently addressed location signal;

a state designating means for establishing a current operating state for the apparatus in response to a mode designation input received from said mode designator means;

said state designating means being operatively connected with said host buffer unit; said state designating means generating a host bus request signal to ascertain whether said host internal bus is available for control by said local processing unit in response to said address hit indication signal received from said address comparing means; said host buffer unit generating a host bus acknowledge signal and operatively connecting said host internal bus with said expansion bus in response to said host bus request signal when said host internal bus is available for control by said local processing unit; said state designating means generating an actuating signal in response to said host bus acknowledge signal, a portion of said actuating signal being state indicating signal, said local buffer unit operatively connecting said local internal bus with said expansion bus in response to said actuating signal; said operative connection of said local internal bus with said expansion bus being effected in a predetermined configuration in response to said state indicating signal.

2. An apparatus for use with a local computing system for coordinating control access by said local computing system to a host computing system as recited in claim 1 wherein the apparatus is integrally formed with said local computing system.

3. An apparatus for use with a local computing system for coordinating control access by said local computing system to a host computing system as recited in claim 1 wherein said address comparing means receives an actuating signal from said mode designator means, said address comparing means responding to said actuating signal to generate said address hit indication signal only when said actuating signal has a predetermined value.

4. An apparatus for use with a local computing system for coordinating control access by said local computing system to a host computing system as recited in claim 1 wherein said state designating means receives an actuating signal from said mode designator means, said state designating means responding to said actuating signal to generate said intervention signal only when said actuating signal has a predetermined value.

5. An apparatus for use with a local computing system for coordinating control access by said local computing system to a host computing system as recited in claim 2 wherein said address comparing means receives an actuating signal from said mode designator means, said address comparing means responding to said actuating signal to generate said address hit indication signal only when said actuating signal has a predetermined value.

6. An apparatus for use with a local computing system for coordinating control access by said local computing system to a host computing system as recited in claim 2 wherein said state designating means receives an actuating signal from said mode designator means, said state designating means responding to said actuating signal to generate said intervention signal only when said actuating signal has a predetermined value.

* * * * *